United States Patent
Klein et al.

(10) Patent No.: US 12,516,173 B2
(45) Date of Patent: Jan. 6, 2026

(54) BIAXIALLY ORIENTED POLYESTER FILM CONTAINING POST-CONSUMER OR POST-INDUSTRIAL REGRIND FROM A COATED POLYESTER FILM, AND OPERATION FOR PRODUCING THE FILM AND THE REGRIND

(71) Applicant: Mitsubishi Polyester Film GmbH, Wiesbaden (DE)

(72) Inventors: Dagmar Klein, Ockenheim (DE); Holger Kliesch, Ginsheim-Gustavsburg (DE); Ranier Kurz, Bad Schwalbach (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 635 days.

(21) Appl. No.: 17/956,936

(22) Filed: Sep. 30, 2022

(65) Prior Publication Data
US 2023/0104902 A1 Apr. 6, 2023

(30) Foreign Application Priority Data
Sep. 30, 2021 (DE) .................... 10 2021 125 368.3

(51) Int. Cl.
*C08J 11/12* (2006.01)
*B09B 3/35* (2022.01)
*B09B 3/40* (2022.01)
*C08J 5/18* (2006.01)

(52) U.S. Cl.
CPC ............ *C08J 11/12* (2013.01); *B09B 3/35* (2022.01); *B09B 3/40* (2022.01); *C08J 5/18* (2013.01); *C08J 2367/02* (2013.01)

(58) Field of Classification Search
USPC .......................................... 521/48
See application file for complete search history.

(56) References Cited

U.S. PATENT DOCUMENTS

| 5,672,428 A | 9/1997 | Muschelweicz et al. |
| 9,636,845 B2 | 5/2017 | Clark |
| 2018/0079878 A1 | 3/2018 | Penache et al. |

FOREIGN PATENT DOCUMENTS

| EP | 2524015 A1 | 11/2012 | |
| EP | 3283295 A1 | 2/2018 | |
| EP | 2524015 B2 * | 4/2024 | .......... B29C 48/022 |
| WO | 94/13474 A1 | 6/1994 | |

OTHER PUBLICATIONS

European Search Report in corresponding European Patent Application No. 22197913.1.

* cited by examiner

*Primary Examiner* — Terressa Boykin
(74) *Attorney, Agent, or Firm* — ProPat, LLC; Cathy Moore

(57) ABSTRACT

The present invention relates to a process for recycling a polyester film that includes comminuting a used polyester film to shreds, the used polyester film including a polyethylene terephthalate polymer, melting the shreds in a twin-screw or multi-screw extruder, filtering the melt, and pelletizing. The present invention further relates to a process for producing a biaxially oriented polyester film that includes melting PET pellets in an extruder, at least 10% by weight of the pellets having been obtained by the process of the invention for recycling a polyester film. The present invention further relates to pellets and to a biaxially oriented polyester film, obtained by the processes of the invention, and also to the use thereof.

24 Claims, No Drawings

BIAXIALLY ORIENTED POLYESTER FILM CONTAINING POST-CONSUMER OR POST-INDUSTRIAL REGRIND FROM A COATED POLYESTER FILM, AND OPERATION FOR PRODUCING THE FILM AND THE REGRIND

CROSS-REFERENCE TO RELATED APPLICATIONS

This application claims priority to German Patent. Application 10 2021 125 368.3 filed Sep. 30, 2021, which is hereby incorporated herein by reference in its entirety.

FIELD OF THE INVENTION

Biaxially oriented polyester film comprising at least one post-consumer or post-industrial regrind, produced to an extent of at least 10% by weight from a coated polyester film, and also a process for producing said film, and in particular a process for producing the stated regrind. Likewise claimed is a regrind consisting of at least 10% by weight of coated polyester film (post-consumer or post-industrial), said regrind having been produced by the process of the invention.

BACKGROUND OF THE INVENTION

The present invention relates to a biaxially oriented polyester film comprising at least post-consumer or post-industrial regrind produced to an extent of at least 10% by weight from a coated polyester film. The coated polyester film is generally siliconized polyester film or comprises coatings with crosslinked or part-crosslinked components such as hard coats. The coated film for producing the regrind has undergone at least one additional operating step, other than the actual polyester film production and converting, and/or the film has been used in its intended end application and has arisen there as "waste". It is therefore a post-consumer or post-industrial regrind. According to the intended use, this film is collected and then, following the removal of any fractions present that are not polyester film, is mechanically recycled. This recycling encompasses the shredding of the film, the subsequent melting of the film in an extruder, and lastly the pelletizing of the melt strands. The extruder used here is a multi-screw extruder. As a result of the use of the multi-screw extruder, the resultant pellets are of substantially better quality with respect to inclusions than when using an industry-standard single-screw extruder. When the pellets are reused in polyester film production, this results in a much lower fish-eye count and in a substantially improved filter life, as compared with the use of a recyclate made from the same starting material but produced using a single-screw extruder.

The increasing importance of recycling as part of the circular economy debate demands solutions, in PET film production operations as well, that allow the use of recycled material. In the field of PET bottles, this has already been industrial reality for 20 years. The used PET bottles are collected and shredded, different plastics (lids, labels, etc.) are subsequently separated off by various methods (including float-sink methods), and the flakes, moreover, are superficially cleaned in an alkaline wash and then melted in an extruder, after which they are repelletized. Lastly, there is either liquid-phase condensation still in the melt or a subsequent condensation to increase molar mass in a tumble dryer to bring the chain length—which has dropped as a result of the operation—back up to an SV of at least 1000, which is required for production of new bottles. The extruders used are typically single-screw extruders (e.g. from the market leader Erema, or from NGR and others), since these extruders can be acquired under more favorable terms and are more robust and cheap in operation than are twin-screw or even multi-screw extruders. Twin-screw and multi-screw extruders are generally employed only when the incorporation (compounding) of other substances (such as white pigments into masterbatches, for example) is required, or else when there is subsequent liquid-phase condensation to increase molar mass after the melting in the single-screw extruder.

Polyester films are frequently employed in laminates (which require costly and complicated separation prior to mechanical recycling) or in long-term applications (e.g. in electronic components, where the polyester fraction is low, and so presently recycling is unrewarding here). These films cannot currently be economically reused at the end of their life cycle. The situation is different with polyester films which are used as "process films". Examples thereof are films which serve as a coating substrate for other films or coating materials, where these other films or coating materials are then removed from the polyester film (e.g. PU casting) and/or are transferred to a different surface (e.g. coating materials in the furniture industry). One particularly major application of this kind is that of siliconized films, which are employed as liners for all kinds of labels. The applied labels are usually peeled mechanically from the film and transferred to the target substrate (e.g. beverage or detergent bottles). This leaves a largely clean polyester film which has a silicone layer and is contaminated with small amounts of adhesive residues and possibly with individual labels which have not been transferred. One method for the recycling of such a film is described in EP2524015 and for a time was also utilized commercially on an industrial scale by the applicant (Mitsubishi Polyester Film Inc. [US]).

A disadvantage of using the raw materials, produced as described in EP2524015, in film production, however, is the relatively short filter life in the film production line, which drops to only 10% by weight of the usual filter life (when using raw materials free from post-consumer regrind). The reduction of the filter life here is dependent on the total amount of siliconized film in the regrind employed (or, after conversion, on the fraction of recycled siliconized film in the newly produced film) that is introduced into the new film. A further disadvantage is the significantly increasing proportion of inclusions (fish-eyes) in the film, which increases the likelihood of film tearing and may be disruptive in the end applications of the film. Shorter filter lives and increased tearing significantly reduce the profitability of film production.

Similar problems have also arisen when reusing regrind produced from process films to which, previously, crosslinked or part-crosslinkable coating materials were applied and removed.

SUMMARY OF ADVANTAGEOUS EMBODIMENTS OF THE INVENTION

The object of the present invention, therefore, was to provide a raw material and an operation for producing said material, consisting at least partly of siliconized films, or films with crosslinked or part-crosslinked layers, that does not have the stated disadvantages on pressure increase, and an object of the present invention, moreover, is to provide a polyester film which comprises this raw material, which can be produced with good profitability and which has an acceptable level of inclusions.

DETAILED DESCRIPTION OF ADVANTAGEOUS EMBODIMENTS OF THE INVENTION

This object is achieved by a process in which the coated polyester film for recycling is melted in a twin-screw or multi-screw extruder, the melt is filtered, and subsequently the melt in strands is cooled and pelletized. Thereafter a biaxially oriented polyester film is produced, consisting wholly or partly of this raw material.

Here:
1. The extruders of the invention for melting the polyester are twin-screw or multi-screw extruders
2. The mass flow supplied to the extruder includes at least 10% by weight of a coated polyester film
3. The melt is filtered prior to pelletizing
4. A biaxially stretched film is produced which consists of at least 10% by weight of the aforesaid polyester raw material.

The extruders used in the process of the invention are exclusively twin-screw or multi-screw extruders. Such extruders are produced commercially by companies including Japan Steel Works.

Unsuitable for the purposes of the invention is the use of single-screw extruders, since these extruders, surprisingly, lead to very much poorer results in the film production process. If single-screw extruders (such as the commercially customary Erema extruders for processing film offcuts or bottle shreds) are used, then the reduction in the filter life in the polyester film production line is so substantial that commercial operation for prolonged periods is no longer possible; this is the case, markedly, when at least 10% by weight of a raw material produced from at least 10 percent by weight of coated polyester film wastes is used. Moreover, there is a fraction of inclusions that increases significantly over the production period, and an intolerable number of instances of film tearing. This is especially surprising because, within the polyester film industry, single-screw extruders are by far the most widespread standard for the processing of wastes arising in the film process. The process wastes (edge strips, start-up and run-down rolls, material from torn films) which arise in the production of siliconized films themselves can also be processed with entirely good quality on single-screw extruders and can be reused. The distinct advantage offered by twin-screw extruders in the processing of post-consumer siliconized film wastes was therefore highly unexpected.

Twin-screw extruders are preferred here over multi-screw extruders, the latter being more expensive to acquire and to operate and offering no advantage in the application of the invention relative to twin-screw extruders. Less preferred in the sense of the invention are combinations of an initial single-screw extruder for melting the polyester wastes, followed by a twin-screw or multi-screw extruder, which serves typically as a discharge unit of an assembly for increasing the melt viscosity. While such a combination does offer better processing properties in terms of the regrind produced, relative to a single-screw extruder on its own, such a combination is poorer than twin-screw or multi-screw extruders alone.

The use of twin-screw extruders also reduced the level of fish-eyes in the film relative to the use of single-screw extruders. Disruptive fish-eyes are generally inclusions having a total defect size of more than 20 μm. The number of such inclusions is dependent on the type of filtration, the residence time of the melt in the extrusion system, and the nature of the raw materials used. A standard which can be used for the purposes of the invention is a film which is produced without post-consumer regrind. When post-consumer regrind produced by means of a single-screw extruder was used, the find rate increased by a factor of 1.3 for only a 10% fraction of post-consumer siliconized film recyclate (based on the total weight of the film). Where, instead, a post-consumer regrind of the same starting material in the same amount was used, but produced by means of a twin-screw extruder, an increase only by a factor of 1.05 was observed. The fish-eyes here are found by eye under polarized light and marked. Structures below 20 μm are virtually undetectable visually, and so it can be assumed that virtually of the defects found have a size of around 20 μm upwards in terms of their planar extent. To be on the safe side, the defects marked are also measured under an optical microscope, and the defects having a length of 20 μm in one spatial direction are counted as fish-eyes. At least three pieces of film measuring 5 m² must always be examined.

The coated films for recycling are films which, after their intended use, arise as waste for the end user. Before being supplied to the extruder, this film waste must be freed from any extraneous material present (other waste, such as beverage cans, paper, etc.), and is ideally collected as single-substance waste by the end user. The film must be shredded before being supplied to the extruder.

The coated films are preferably siliconized films, these being films which have a silicone layer. This silicone layer is constructed of poly (organo) siloxanes, which are comprised of individual siloxane units. The composition the siloxane unit is obtained by considering the fact that each oxygen atom is present as a bridging line between pairs of silicon atoms: $R_nSiO_{(4-n)/2}$ (n=0, 1, 2, 3), i.e., that a siloxane unit can have one to four further substituents, depending on a number of remaining free valencies on the oxygen. Siloxane units accordingly may be mono-, di-, tri- and tetrafunctional. In symbolic notation, this is represented by the letters M (mono), D (di), T (tri) and Q (quatro): $[M]=R_3SiO_{1/2}$, $[D]=R_2SiO_{2/2}$ and $[T]=RSiO_{3/2}$.

As in the case of the organic polymers, the basis for the multiplicity of compounds that are possible is the capacity for different siloxane units to be linked to one another in the molecule. In a modification of the systematic approach for organic polymers, the following groups can be differentiated:

cyclic polysiloxanes are comprised annularly of difunctional siloxane units. Structural forms $[D_n]$.

linear polysiloxanes with the structural form of $[MD_nM]$ or $R_3SiO[R_2SiO]_nSiR_3$ (e.g. poly (dimethylsiloxane))

branched polysiloxanes having trifunctional or tetrafunctional siloxane units as branching elements. Structural form $[M_nD_mT_n]$. The one or more branching points are installed either in a chain or a ring.

crosslinked polysiloxanes: this group comprises catenated or annular molecules linked by means of tri- and tetrafunctional siloxane units to form planar or three-dimensional networks. For the construction of silicones of high molecular mass, chain formation and crosslinking are the dominant principles.

The polyester films which are used in the recycling process of the invention may have any kind of silicone coating. Reference is made illustratively at this point to U.S. Pat. No. 5,672,428 A. Said document describes siliconized films which can be used in accordance with the present invention. The siliconized films described therein are polyester films provided with a silicone coating. The coating composition of the silicone coating comprises an alkyl vinylpolysiloxane containing vinyl groups, a catalyst, which is a platinum complex or a tin complex, a glycidoxysilane and an alkylhydrogen polysiloxane which contains 1.5 to 2 mol % of hydrogen.

Less preferred are other coated polyester films, such as, for example, the coating-material transfer films described above that still contain residues of the transferred coating materials. Depending on the nature of the coating material used and the amount remaining, there may be unwanted odor given off or film discoloration occurring during film production. Such other coated polyester films are therefore present in one preferred embodiment at less than 20% by weight and preferably at less than 10% by weight, and ideally not at all, in the incoming material.

In one preferred embodiment, in the total area average, the fraction of the siliconized films has a silicone layer thickness of <0.5 µm, preferably of <0.4 µm, more preferably of less than <250 nm and ideally of less than <180 nm. The greater the mean layer thickness of the silicone, the higher the number of inclusions in the regrind-containing film later on and the shorter the filter life in the production of said film. It is therefore preferable for the purposes of the invention for the siliconized film to be predominantly a film wherein the siliconization has been applied during film production (in-line), since in this case the silicone layer thicknesses are usually below 200 nm. Such products are available for example under the brand name HOS-TAPHAN® RN 23 2SLK from Mitsubishi Polyester Film GmbH Deutschland, but also from SILICONATURE® (Italy). If film wastes to be reutilized include those siliconized off-line (silicone layers of typically 0.5-3 µm), then in this preferred embodiment, they should be blended with in-line-siliconized film wastes so that the mean silicone layer thickness in the starting material does not exceed the stated limits. The silicone layer thickness of the respective liner (the term for siliconized film as a carrier of labels) may be determined, for all of the types of liner present in the waste, by means of known methods (e.g. incision of the film and measurement of the layer thickness under an electron microscope, or else alternatively by means of optical methods such as ellipsometry). Following the determination of the layer thickness for the types of liner present in the waste, the proportions thereof must be adjusted in the process so that, as mentioned above, the preferred ranges of the mean layer thicknesses are not exceeded.

Within the circular economy debate, the "cradle to cradle" approach is the most preferred. This means that at the end of its life cycle a product is regenerated (recycled) and this regenerated material, or regrind, is used to produce the same product again. In that way a true circular economy is realized. The objective is therefore to use as much "post-consumer" siliconized film regrind as possible, with a maximum fraction thereof, in the production of new siliconized films.

The fraction of siliconized film in the incoming material for recycling is therefore at least 10% by weight, preferably at least 50% by weight, more preferably at least 90% by weight and ideally >99% by weight.

Besides the siliconized film, the incoming material may contain other post-consumer/post-industrial polyester wastes, such as, for example, other polyester film wastes (coated or uncoated), or else shreds of polyester bottles and trays. Since in that case, however, these wastes are not returned to their original application, they are, within the limits stated above, less preferable for the purposes of the invention.

Likewise not preferred is the addition of "virgin" polyesters or of operating wastes from polyester film production that have not yet been utilized as a product by a private or industrial end customer. Such polyesters are present in the incoming material at less than 15% by weight and preferably at less than 5% by weight, and ideally not at all.

Besides other polyester wastes, there are usually also individual labels on the film which have not been properly transferred to the target substrate in the end user operation. As well as the label material itself, these labels introduce printing ink and adhesives into the melt. These components may lead to discoloration in the melt and in the film subsequently produced, or else may block the filters during regrind production or during film production. There is a considerable risk, moreover, of intolerable odor nuisance in the production of the regrind and in particular, later on, in the production of the film. Residues of labels must therefore be removed prior to regrind production. This may be accomplished, for example, by manually sorting film webs affected or by automated sorting of the shreds on a conveyor belt, via color recognition with removal of the shreds concerned by blowing. The materials below are therefore subject to the following limits, irrespective of whether they have entered the shreds as residual labels or from another source.

Paper in shreds which is introduced into the extruder may be present at not more than 1% by weight, preferably not more than 0.3% by weight and ideally at less than 0.05% by weight. Because paper burns in the extruder and clogs the melt filters, this leads to black inclusions which may subsequently lead to film tearing. If the stated ranges are exceeded, economical production of regrind and film is no longer possible.

Printed polyesters with a PET content of more than 70% by weight (the remaining 30% by weight at most may be accounted for by other monomers such as isophthalic acid, cyclohexanedimethanol, diethylene glycol, naphthalinedicarboxilic acid, propanediol, butanediol, etc.) are present in the shredded material at not more than 7% by weight, preferably not more than 4% by weight, more preferably not more than 1% by weight, and ideally below 0.5% by weight.

Polypropylene is present in the shredded material at not more than 2% by weight, preferably not more than 1% by weight, more preferably not more than 0.5% by weight, and ideally at less than 0.1% by weight. Polypropylene in general does not block the filters to a high degree, but does lead to a considerable odor nuisance and to a marked, unwanted clouding of the film subsequently produced from the regrind that is generated.

Any other polymers possibly present are included in the shredded material at not more than 0.8% by weight, preferably not more than 0.1% by weight, and ideally at less than 0.05% by weight.

Before the concluding pelletization, the melt is filtered. Typically for this purpose metal-fabric filters or sintered-metal filters are used. The use of self-cleaning filters, as available from Gneuβ, for example, is also possible, however.

The stated nominal pore size of the final filtration stage in these cases is less than/equal to 100 µm, preferably less than or equal to 80 µm, more preferably less than 50 µm, and ideally less than/equal to 30 µm. Upstream of this final stage there may be a further filter (pore size greater than 80 µm), this being an advantage especially when the shredded material still contains paper above the ideal range. The lower the pore size of the final filtration stage, the longer the filter life in the film production line. Since filter changes in the film production line are substantially more expensive than those in the extruder for regrind production, this is an advantage. The lower the pore size at the regrind extruder, however, the shorter the filter life at said extruder as well. The low pore sizes can therefore be used in general when the aforementioned extraneous-material contamination of the shredded material is at the stated low levels.

Filter life in the context of this invention is understood to be the timespan for which a filter can be operated for production purposes, from the time of its installation to the point where it exceeds a maximum permissible pressure value. The absolute height of the maximum pressure value is specific to line and filter, and so the filter life as well is variable depending on the system used (but reproducible per system selected). Filter systems which permit high pressure differences upstream and downstream of the filtering lead to longer filter lives, but are also more costly and complicated to implement, owing to the higher absolute pressures. An attempt is generally made to find a trade-off between the longest possible filter lives with at the same time the avoidance of high absolute pressures, in order to keep the technical cost and complexity low.

The filter life is essentially dependent on the degree of contamination of the raw materials with extraneous material. Post-consumer regrind in particular leads in general to a marked decrease in the filter life, of just a few days, and this makes film production economically unprofitable.

The recyclate may be condensed to higher molar mass either still in the melt (liquid-phase condensation for higher molar mass) or following pelletization, in a tumble dryer. Liquid-phase condensation for higher molar mass is preferred here, since it takes place in the same operating step as the first extrusion and removes volatiles from the melt more effectively than a tumble dryer removes them from the solid pellets. As a result, the odor nuisance in film production can be reduced significantly. The increase in the viscosity itself is advantageous only beyond a fraction of more than 30% by weight of post-consumer regrind in film production, since before that point the viscosity can be more easily adjusted by way of the other raw materials used.

Because the regrind is largely transparent, if it has not been condensed to higher molar mass in a tumble dryer and if the incoming material was comprised of largely clear siliconized films, it has proved to be favorable if prior to use, the pellets are inspected by means of optical (or x-ray) automated inspection and pelletized granules containing large inclusions (>30 µm) are removed (e.g. at Sikora AG, Bremen, Germany).

These pellets can subsequently be used again in the production of a biaxially oriented polyester film, or less preferably, for other polyester applications.

In one preferred embodiment the post-consumer regrind used has a filter test rating of acceptable or better.

In the film production of the invention, at least 10% by weight, preferably at least 25% by weight and ideally at least 31% by weight of the regrind of the invention is added, based on the total weight of the film. The film may be produced from 100% by weight of the regrind, but levels of more than 50% by weight are less preferred, since in that case, even when using a twin-screw extruder, there is a markedly reduced filter life in the film production process. Moreover, the preferred target application of the film is again a siliconized film as a liner for labels. Since this film is to be recycled after it has been used, indeed, also in accordance with the process described here, in the case of regrind fractions of more than 50% by weight, the silicone remaining on the film accumulates in the process, leading in turn to falling filter lives and to more inclusions in the resultant films.

If, nevertheless, post-consumer regrind fractions of more than 50% by weight are to be achieved, it has proved to be favorable if additionally a post-consumer recyclate made from uncoated polyester films is used, and/or preferably a regrind made from polyester bonds, and/or more preferably if a chemically recycled polyester made from post-consumer polyester wastes is used in order to close the gap to the target regrind fraction.

The other polymer raw materials present in the film are thermoplastic polyesters to an extent of at least 95% by weight, more preferably at least 98% by weight. Preferred in this case is a polyester of ethylene glycol and terephthalic acid (=polyethylene terephthalate, PET). Less suitable are polyesters which contain naphthalene-2,6-dicarboxylic acid as a repeating unit, since these polyesters make the film more highly priced without leading to further advantages in the principal target application of liners for labels. The polyester may contain further monomers, such as isophthalic acid or cyclohexanedimethanol or ethylene glycol. Based on the total weight of the film, the fraction of other monomers, apart from ethylene glycol und terephthalic acid, is <7% by weight, since otherwise the mechanical stability of the film deteriorates, this being unwanted in the majority of target applications.

Polymers other than the thermoplastic polyesters are added at less than 5% by weight, preferably at less than 1% by weight, and ideally not at all.

As well as the aforementioned polymers, the film may comprise particles, such as calcium carbonate, silicon dioxide or aluminum trioxide, for example. Such particles are added to improve the slip behaviour or for dulling and are included in the film typically at less than 2%, preferably at less than 1% and ideally at less than 0.5% by weight.

In a less preferred embodiment, the film may contain whitening particles such as titanium dioxide and barium sulfate, which are present in the film at 19% by weight at most. Where whitening particles are included, the figures given above for the polymer contents relate only to the polymer fraction of the film, taking no account of the inert white pigment. White polyester films are less preferred for the purposes of the invention, since they cannot themselves currently be reused, given that separate collection is presently unrewarding, because of the small overall amount, and they cannot be mixed with the transparent coated films, since in that case the color of the resultant film is not adjustable, given fluctuating levels of white films in the incoming material.

The film may comprise further additives, such as radical scavengers (e.g. IRGANOX® 1010) or dyes (preferably blue dyes to compensate the yellow fraction). The fraction of such further additives is <0.5% by weight and preferably <0.3% by weight.

The film may have one or more layers. In one preferred embodiment it is an at least three-layer film. In a preferred at least 3-layer embodiment, the post-consumer regrind is added to only one or to two or more internal layers, while the two outer layers are produced from virgin polymer. This has the advantage that any inclusions and impurities present in the post-consumer regrind have less of an effect on the film surface and so cause less disruption in the end application.

The total film thickness is at least 12 µm and preferably at least 15 µm. If the film is thinner than 12 µm, inclusions in the post-consumer regrind lead significantly more often to film tearing than is the case with thicker films.

For the production of the film of the invention, the SV of the polyester is judiciously selected such that the film has an SV of >600, preferably of >650 and ideally of >700. The SV of the film in this case is preferably <950 and more preferably <850. If the SV is below 600, then the film even during production becomes so fragile that there are frequent tears. Moreover, at a relatively low SV, the mechanical strengths stated later on below are no longer reliably attained. If the film has a higher SV than 950, the polymer becomes so tough in the extruder that power levels are excessively high and there are fluctuating pressures during extrusion. This results in poor running reliability. Moreover, the abrasion at the extrusion tools and at the cutting tools becomes disproportionately high.

These levels are achieved by adjusting the arithmetic mean of all the starting raw materials (including the post-consumer regrind), weighted according to their weight fractions, in such a way that said arithmetic mean is around 10-100 SV units above the respective target value for the film. Since the reduction in the SV during film production is heavily dependent on the line, it is necessary to ascertain the level that is valid for the particular film line.

The film of the invention additionally has an elasticity modulus in both film directions (TD and MD) of greater than 3000 N/mm$^2$ and preferably of greater than 3500 N/mm$^2$ and more preferably (in at least one film direction) of >4000 N/mm$^2$ in machine and transverse directions. The F5 values (force at 5% elongation) in machine and transverse directions are preferably more than 80 N/mm$^2$ and more preferably greater than 90 N/mm$^2$. These mechanical properties may be established and obtained by varying the parameters of the biaxial stretching of the film as part of the process conditions indicated below.

In application, films having the stated mechanical properties are not unduly stretched under tension, remain readily guidable, and have a stiffness of the kind desired in the end application.

In one preferred embodiment the film undergoes in-line siliconization. Examples of in-line siliconization are given in U.S. Pat. No. 5,672,428 (which is hereby incorporated by reference) or in EP3283295, for example.

The dry layer thickness of the silicone is established in this case such that it is at least 60, preferably at least 80 and ideally at least 90 nm thick. If the layer is thinner than 60 nm, the adhesives typically used in the label industry adhere too strongly to the film and the label cannot be easily peeled off. The layer thickness is <180 nm and preferably <170 nm. If the layer thickness is greater than 180 nm, there are increased instances of the problems already described above in the regeneration and in the renewed use of the post-consumer regrind.

Process for Producing the Film

The polyester polymers of the individual layers are obtained as regrinds, such as the post-consumer regrind of the invention, and/or produced by polycondensation, either starting from dicarboxylic acids and diol or—albeit less preferably—starting from the esters of the dicarboxylic acids, preferably the dimethyl esters, and diol. Polyesters that can be used preferably have SV values in the range from 500 to 1300; while the individual values used are less important, the mean SV of the raw materials used must be greater than 700 and is preferably greater than 750. These values are judiciously used in order to attain the SV values described above for the film. If the SV is too low, the film becomes brittle; if it is too high, the stretching forces in the operation increase sharply and economic production is therefore significantly impaired.

First of all the polyester of the individual layers is compressed and rendered flowable in extruders. In one preferred embodiment the melt temperatures (temperature measured in the melt at the extruder outlet) are between 290° C. to 300° C. At temperatures above 300° C., there is an increase in the yellowness index, at temperatures below 290° C., an increase in the risk of unmelted polymer fractions, which may lead to unwanted surface elevations. This temperature is established by way of the throughput-to-rotation rate ratio of the extruder, and/or by way of the temperatures of the extruder heating system. These respective conditions and temperatures are dependent on the type of extruder user and should be adjusted by the skilled person by means of the parameters stated. The melt is filtered upstream of the die via a sintered-metal or metal-fabric filter, where the nominal pore size of the filter is <50 µm, preferably smaller than 35 µm and ideally <21 µm, and preferably >10 µm. At more than 50 µm, there are too many inclusions in the film and an increased number of film tears. At <10 µm pore size, the filter life is too short. The melts are then shaped in a coextrusion die to form flat melt films, forced through a flat-film die, and drawn off on a chill roll and one or more take-off rolls, where they cool and solidify.

The film of the invention is biaxially oriented, i.e. biaxially stretched. The biaxial stretching of the film is most frequently carried out sequentially. Here it is preferable to stretch first in longitudinal direction (i.e. machine direction, MD) and subsequently in transverse direction (i.e. perpendicularly to machine direction, TD). Stretching in longitudinal direction may be carried out by means of two rolls running at different speeds in accordance with the target stretching ratio. For the transverse stretching, a corresponding tenter frame is generally utilized. The skilled person is able to establish the mechanical properties of the film, such as elasticity modulus, stiffness and extensibility, through the choice of appropriate stretching parameters.

The temperature at which the stretching is performed may vary within a relatively wide range and is guided by the desired properties of the film. Generally speaking, the stretching in longitudinal direction is carried out in a temperature range from 80° C. to 130° C. (heating temperatures 80° C. to 130° C.) and in transverse direction in a temperature range from 90° C. (start of stretching) to 140° C. (end of stretching). The longitudinal stretching ratio is in the range from 2.5:1 to 4.5:1, preferably from 2.8:1 to 4.0:1. A stretching ratio of more than 4.5 leads to significantly impaired producibility (break-offs). The transverse stretching ratio is generally in the range from 2.5:1 to 5.0:1, preferably from 3.2:1 to 4.0:1. For attainment of the desired film properties it has proved to be advantageous if the stretching temperature (in MD and TD) is below 125° C. and preferably below 118° C. Prior to the transverse stretching, one or both surfaces of the film may be coated in-line in accordance with the methods known per se.

In the subsequent heat-setting, the film is held under tension at a temperature of 150° C. to 250° C. for a period of about 0.1 s to 10 s. The film is subsequently wound up in a conventional way.

Analysis

The following measurements were utilized to characterize the raw materials and the films:

SV (Standard Viscosity)

The standard viscosity SV (DCA) was measured on the basis of DIN 53 726 at a concentration of 1% in dichloroacetic acid in an Ubbelohde viscometer at 25° C. The dimensionless value SV is ascertained from the relative viscosity ($\eta_{rel}$) as follows:

$$SV=(\eta_{rel}-1)\times 1000$$

For this purpose, film or polymer raw materials were dissolved in DCA. The fraction of particles was ascertained by ashing and corrected by appropriate increase in input weight, i.e.:

input weight=(specified input weight)/((100 particle content in % by weight)/100)

Mechanical Properties

The mechanical properties were determined via tensile testing on the basis of DIN EN ISO 527-1 and -3 (type 2 specimens) on film strips measuring 100 mm×15 nm.

Filter Test

The raw material is melted in a single-screw extruder at a throughput of 2.4 kg/h and forced at 290° C. through a filter with 10 μm metal-fiber fabric (e.g. from Bekaert), with a filter area of 50 cm². The pressure upstream of the filter is measured permanently throughout the extrusion time.

The filtration quality is rated on the basis of the pressure difference between 60 and 15 min extrusion time.

Very good<2 bar pressure increase
Good 2-8 bar pressure increase
Acceptable 9-20 bar pressure increase
Poor 21-30 bar pressure increase
Very poor>31 bar pressure increase Examples The used siliconized polyester films were collected in single varieties after utilization at various dispensing operations (beverages/detergents).

The bags with the liners were emptied out onto a conveyor belt and extraneous material was removed manually. Visible labels were likewise removed as far as possible. The film was subsequently shredded and every two hours a 1 kg sample of the shredded material was investigated for the amount of label material remaining (label material was separated off and weighed). The mean silicone layer thickness of these samples was likewise determined (the layer thickness was measured by ellipsometry on 50 flakes and averaged). The values reported in the table represent an average of four such samples. For the comparative examples with increased residual label content, the labels were not removed.

The shreds were subsequently melted respectively in a twin-screw extruder from Japan Steel Works, and the shredded material processed in the same way was melted for comparison in a single-screw extruder from Erema. The shredded material for a comparative example 6 was melted in a single-screw extruder from NGR with attached liquid-phase condensation for higher molar mass, with multi-screw discharge unit. The melt was subsequently filtered through a 30 μm metal-fabric filter, and then pelletized.

The post-consumer regrind obtained in this way was then mixed, as indicated in the table, with the other polymers and melted at 292° C., filtered through a 20 μm (pore volume) metal-fabric filter and applied electrostatically, through a flat-film die, to a chill roll controlled to 50° C. It is then subjected to first longitudinal and then transverse stretching, under the following conditions:

| | | | |
|---|---|---|---|
| Longitudinal stretching | Heating temperature | 75-115 | ° C. |
| | Stretching temperature | 115 | ° C. |
| | Longitudinal stretching ratio | 3.8 | |
| Transverse stretching | Heating temperature | 100 | ° C. |
| | Stretching temperature | 112 | ° C. |
| | Transverse stretching ratio (inclusive of stretching in 1$^{st}$ setting field) | 3.8 | |
| Setting | Temperature | 237-150 | ° C. |
| | Duration | 3 | s |
| Setting | Temperature of 1$^{st}$ setting field | 170 | ° C. |

The transverse stretching was preceded by silicone coating as in example 7 from U.S. Pat. No. 5,672,428. The thickness of the silicone layer on the completed set film was 110-125 nm.

Raw materials employed in the examples are as follows:

PET1=polyethylene terephthalate raw material made from ethylene glycol and terephthalic acid, having an SV of 820 (isophthalic acid content <0.1% by weight, DEG 1% by weight).

PET2=polyethylene terephthalate raw material made from ethylene glycol and terephthalic acid, having an SV of 790 (isophthalic acid content <0.1% by weight, DEG 1.1% by weight). With 1% by weight of SYLYSIA® 320 from Fuji Sylysia Japan PET3=polyethylene terephthalate raw material made from ethylene glycol and terephthalic acid, having an SV of 1020 (isophthalic acid content <0.1% by weight, DEG 1% by weight).

In film production, a maximum of one tear every 8 h is acceptable; anything else is uneconomic. If the pressure in the filter of the base layer B rises to a greater extent than normal (in production without post-consumer recyclate, the filter life is typically >14 days), the economic viability falls, as the filter reaches the pressure limit more quickly and has to be changed. A high pressure increase may result in the pressure limit being achieved within less than two days, for example; this is clearly uneconomic. A marked clouding of the film is undesirable in the target application. A distinctly perceptible odor given off is undesirable.

The expression "high pressure increase" is to be understood to mean that the pressure rises more quickly than normal and the maximum pressure is achieved within a shorter time.

Tables 1 (table for the regrinds produced) and 2 (table for the films produced using the regrinds contained in table 1) below summarize the formulations and resultant raw-material and film properties:

TABLE 1

| | | Regrind name | | | | | |
|---|---|---|---|---|---|---|---|
| | | RG1 | RG2 | RG3 | RG4 | RG5 | RG6 |
| | | | | Example | | | |
| | | 1 | CE1 | CE2 | 2 | 3 | CE3 |
| Extruder | Single-screw extruder | | x | | | | x |
| | Double-screw extruder | x | | x | x | x | |

TABLE 1-continued

|  |  |  |  |  |  |  |  |
|---|---|---|---|---|---|---|---|
| | Single-screw extruder with attached liquid phase condensation for higher molar mass, with multi-screw discharge unit | | | | | | |
| Impurities from residual amounts of labels | Paper content in % by weight | 0 | 0 | 0 | 0 | 0.01 | 0.01 |
| | Polypropylene content in % by weight | 0.013 | 0.012 | 2.5 | 0.2 | 0 | 0 |
| | Polyester-base labels in % by weight | 0 | 0 | 0 | 0 | 0 | 0 |
| | Other polymers in % by weight | 0 | 0 | 0 | 0 | 0 | 0 |
| Others | Mean thickness of the silicone layer in nm | 121 | 119 | 122 | 117 | 119 | 121 |
| | lifetime of the filter in regrind production in hours | 24 | 20 | 20 | 21 | 20 | 18 |
| | Filter test result | very good | poor | good | good | good | poor |
| | SV of pellets | 620 | 610 | 600 | 610 | 619 | 608 |
| | Odor given off | none | none | very strong | noticeable | none | none |
| Comments | | | | Pellets were hazy | | | |

|  |  | Regrind name | | | | |
|---|---|---|---|---|---|---|
| | | RG7 | RG8 | RG9 | RG10 | RG11 |
| | | | | Example | | |
| | | CE4 | 4 | CE5 | CE6 | CE7 |
| Extruder | Single-screw extruder | | | x | | |
| | Double-screw extruder | x | | | | x |
| | Single-screw extruder with attached liquid phase condensation for higher molar mass, with multi-screw discharge unit | | | | x | |
| Impurities from residual amounts of labels | Paper content in % by weight | 1.1 | 0 | 0 | 0 | 0 |
| | Polypropylene content in % by weight | 0 | 0 | 0 | 0.012 | 0.014 |
| | Polyester-base labels in % by weight | 0 | 4 | 4 | 0 | 0 |
| | Other polymers in % by weight | 0 | 0 | 0 | 0 | 0 |
| Others | Mean thickness of the silicone layer in nm | 118 | 117 | 123 | 119 | 605 |
| | lifetime of the filter in regrind production in hours | 2 | 22 | 20 | 20 | 20 |
| | Filter test result | very poor | very good | poor | acceptable | acceptable |
| | SV of pellets | 595 | 609 | 597 | 750 | 610 |
| | Odor given off | smelled burnt | noticeable | noticeable | none | none |
| Comments | | Black inclusions in the pellets | Pellets slightly grey | Pellets slightly grey | | |

40

TABLE 2

|  |  | Example | | | | | | | | |
|---|---|---|---|---|---|---|---|---|---|---|
| | Raw material | FE1 | FE2 | FE3 | CFE1 | CFE2 | CFE3 | CFE4 | CFE5 | CFE6 |
| Layer A/A' each 2 μm thick | PET 1 | 94 | 94 | 94 | 94 | 94 | 94 | 94 | 94 | 94 |
| | PET 2 | 6 | 6 | 6 | 6 | 6 | 6 | 6 | 6 | 6 |
| Middle layer B 19 μm thick | PET 1 | 40 | 40 | 40 | 38 | 36 | 90 | 40 | 40 | 40 |
| | PET 2 | 0 | 0 | 0 | 0 | 0 | 0 | 0 | 0 | 0 |
| | PET 3 | 20 | 20 | 20 | 22 | 24 | 5 | 20 | 20 | 20 |
| | RG1 | 40 | | | | | | | | |
| | RG2 | | | | | 40 | | 5 | | |
| | RG3 | | | | | | 40 | | | |
| | RG4 | | | | | | | | | |
| | RG5 | | | | 40 | | | | | |
| | RG6 | | | | | | | | 40 | |
| | RG7 | | | | | | | | | |
| | RG8 | | 40 | | | | | | | |
| | RG9 | | | | | | | | | |
| | RG10 | | | | | | | | 40 | 0 |
| | RG11 | 0 | 0 | 0 | 0 | 0 | 0 | 0 | 0 | 40 |
| Other | Mean thickness of the silicone layer in nm | 100 | 100 | 100 | 100 | 100 | 100 | 100 | 100 | 100 |
| | Pressure increase filter layer B | normal | normal | normal | high | slightly higher than normal | slightly higher than normal | high | higher than normal | slightly higher than normal |

TABLE 2-continued

| | Raw material | FE1 | FE2 | FE3 | CFE1 | CFE2 | CFE3 | CFE4 | CFE5 | CFE6 |
|---|---|---|---|---|---|---|---|---|---|---|
| | Film tears in 8 h | none | none | none | 3 | 1 | 1 | 2 | 2 | 2 |
| | Odor given off | none | none | none | none | severe | none | none | none | none |
| Elasticity modulus MD/CD in n/mm² | | 4150/4900 | 4050/5000 | 4270/4870 | 4100/4790 | 4230/4990 | 4150/4806 | 4210/4870 | 4120/4910 | 4080/5050 |
| Comments | | | End face of roll slightly grey | | | Film markedly hazy | Pressure increase perceptible even at the low level of addition | | | |

That which is claimed:

1. A process for recycling a polyester film, comprising
   (a) comminuting a used polyester film to shreds, the used polyester film comprising a polyethylene terephthalate polymer,
   (b) melting the shreds in a twin-screw extruder,
   (c) filtering the melt, and
   (d) pelletizing,
   wherein the used polyester film comprises a silicone coating, and the silicone coating has a layer thickness of less than 180 nm.

2. The process as claimed in claim 1, wherein the shreds in step (b) are melted in a twin-screw extruder.

3. The process as claimed in claim 1, wherein the used polyester film comprises a silicone coating.

4. The process as claimed in claim 3, wherein the layer thickness of the silicone coating is less than 0.5 μm.

5. The process as claimed in claim 3, wherein the layer thickness of the silicone coating is less than 250 nm.

6. The process as claimed in claim 3, wherein the layer thickness of the silicone coating is less than 180 nm.

7. The process as claimed in claim 1, wherein in step (c) the filtering step comprises filtering the melt through metal-fabric filters or sintered-metal filters.

8. A process for recycling a polyester film, comprising
   (a) comminuting a used polyester film to shreds, the used polyester film comprising a polyethylene terephthalate polymer,
   (b) melting the shreds in a twin-screw or multi-screw extruder,
   (c) filtering the melt, and
   (d) pelletizing,
   wherein the filtering step comprises filtering the melt through a filter having a nominal pore size in a final filtration stage of ≤100 μm.

9. The process as claimed in claim 1, wherein the filtering step comprises filtering the melt through a filter having a nominal pore size in a final filtration stage of ≤80 μm.

10. The process as claimed in claim 1, wherein the filtering step comprises filtering the melt through a filter having a nominal pore size in a final filtration stage of ≤30 μm.

11. A process for producing a biaxially oriented polyester film, comprising (a) melting PET pellets in an extruder, at least 10% by weight of the pellets having been obtained by a process as claimed in claim 1,
   (b) extruding the resulting melt through a flat-film die,
   (c) cooling the extrudate on a chill roll and solidifying to a film,
   (d) biaxially stretching the film.

12. The process as claimed in claim 11, wherein at least 25% by weight of the pellets have been obtained by a process according to claim 1.

13. The process as claimed in claim 11, wherein at least 31% by weight of the pellets have been obtained by a process according to claim 1.

14. The process as claimed in claim 11, wherein the mean SV of the PET pellets is >700.

15. The process as claimed in claim 11, wherein the mean SV of the PET pellets is >750.

16. The process as claimed in claim 11, wherein the biaxially stretching step (d) comprises sequentially biaxially stretching.

17. Pellets formed from the process as claimed in claim 1.

18. A biaxially oriented polyester film comprising pellets formed from the process as claimed in claim 1.

19. The biaxially oriented polyester film as claimed in claim 18, wherein the polyester film contains at least 10% by weight of pellets as claimed in claim 1.

20. The biaxially oriented polyester film as claimed in claim 18, wherein the polyester film contains at least 25% by weight of pellets as claimed in claim 1.

21. The biaxially oriented polyester film as claimed in claim 18, wherein the polyester film contains at least 31% by weight, of pellets as claimed in claim 1.

22. Release liner film comprising the biaxially oriented polyester film as claimed in claim 18.

23. The process as claimed in claim 8, wherein a wherein the filtering step comprises filtering the melt through a filter having a pore size greater than 80 μm upstream of a final filtration stage through filter having a nominal pore size of ≤50 μm.

24. The process as claimed in claim 8, wherein the melting step is in a twin-screw extruder and film containing 10 wt % post-consumer siliconized film recyclate increased disruptive fish eyes within resulting film by a factor of 1.05 compared to film produced without post-consumer regrind.

* * * * *